United States Patent [19]

Homes

[11] Patent Number: 4,573,659

[45] Date of Patent: Mar. 4, 1986

[54] FLUID CONTROL VALVE

[75] Inventor: Graham D. Homes, London, England

[73] Assignee: Lucas Industries Public Limited Company, Birmingham, England

[21] Appl. No.: 585,930

[22] Filed: Mar. 5, 1984

[51] Int. Cl.[4] .............................................. F16K 31/07

[52] U.S. Cl. .......................... 251/129.02; 251/129.01; 251/129.15; 239/585; 239/533.9; 335/257; 335/271

[58] Field of Search ....................... 251/77, 79, 85–87, 251/129, 138, 141, 64, 287, 288, 80; 310/14, 23; 335/258, 273; 74/470; 239/452, 453, 456, 533.2–533.11, 585

[56] References Cited

U.S. PATENT DOCUMENTS 2,826,215 3/1958 Wolfslav et al. .................... 251/129

3,760,840 9/1973 Gates .................................. 137/493

3,952,774 4/1976 Loveless ........................... 137/625.5

4,176,822 12/1979 Chadwick .......................... 251/129

*Primary Examiner*—Samuel Scott

*Assistant Examiner*—Noah Kamen

[57] ABSTRACT

A fluid control valve includes an axially slidable valve member which is coupled directly to the armature of an electromagnetic actuator by a valve stem. The valve member has a head which is drawn into contact with a seating when the device is energized. In this position a step defined between the valve member and the stem is exposed beyond the body containing the valve member. The step is engaged by a spring abutment collar slidable on the stem and engaged by a return spring which biases the valve open and an anti bounce spring. The opposite end of the spring is connected to the stem and the spring is compressed during movement of the valve member and armature to the open position after the collar has engaged the body. The spring then returns the valve member to its normal open position.

4 Claims, 2 Drawing Figures

FLUID CONTROL VALVE

BACKGROUND OF THE INVENTION

This invention relates to electromagnetically operable fluid control valves more particularly but not exclusively, for use in fuel injection pumping apparatus of the kind intended to supply fuel to an internal combustion engine.

There is an increasing demand in the field of fuel injection equipment for valves which can be operated at high repetition rates and which can handle fuel at high pressures. The reason for this is that electronic control equipment is better able to take into account various engine operating parameters and desired operating parameters than for example mechanical or hydraulically acutated equipment. Such valves will in use, be expected to operate for extended periods without service and will operate at high repetition rates.

SUMMARY OF THE INVENTION

The object of the invention is to provide a fluid control valve in a simple and convenient form.

According to the invention an electromagnetically operable fluid control valve comprises a valve member slidable axially within a bore in a valve body, an electromagnetic device including a stator structure and an armature, an extension connecting the armature and valve member whereby when the device is energised the armature will move the valve member to the closed position, a spring abutment slidable on said extension and engageable with the valve member, a first coiled compression spring acting between said abutment and a part fixed relative to the valve body said spring acting when the electromagnetic device is deenergised to urge the valve member to the open position, the extent of movement of said abutment under the action of the spring being limited by its contact with the valve body, and a second coiled compression spring acting between said spring abutment and a part secured to the stem, said second spring acting to allow continued movement of the valve member beyond the normal open position after the spring abutment has contacted the valve body, and thereafter returning the valve member to the normal open position.

DETAILED DESCRIPTION OF THE EMBODIMENT

Figure 1:
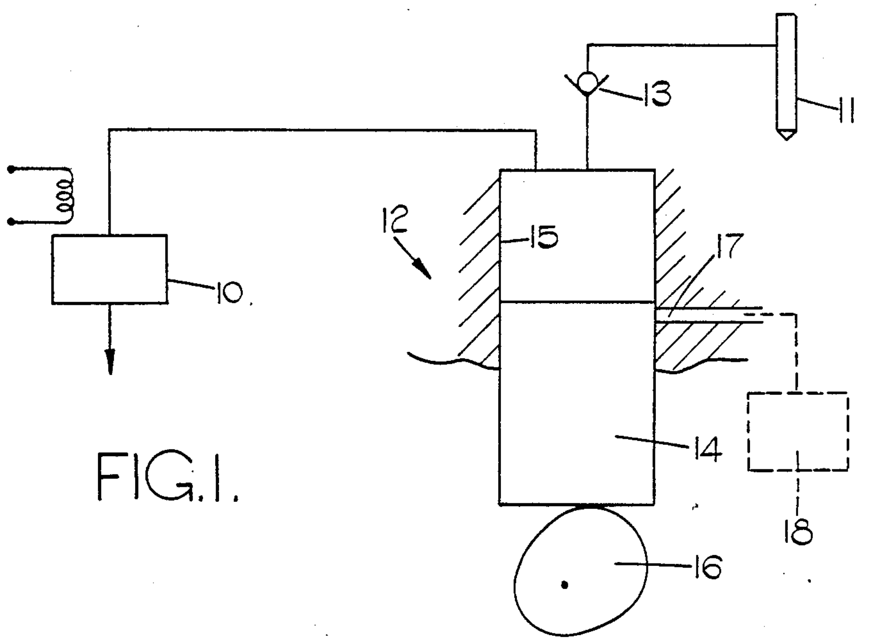
FIG. 1 is a block diagram of a fuel pumping apparatus incorporating a valve.

Referring to FIG. 1 of the drawings the electromagnetically operated valve is shown at 10 and is incorporated in a fuel pumping apparatus for supplying fuel to an injection nozzle 11 of a compression ignition engine. Fuel under pressure is supplied by a cam operated fuel pump 12, the pumping chamber of which is connected to the injection nozzle 11 which connection may include a non-return delivery valve 13. The pumping chamber can also be placed in communication with a drain by way of the valve 10.

The pump 12 includes a piston movable inwardly to displace fuel from the cylinder 15 in which it is located, by means of an engine driven cam 16. Outward movement of the plunger is effected by the action of a spring not shown. Formed in the wall of the cylinder is a fuel supply port 17 which is connected to a source 18 of fuel at a low pressure and in use, as the plunger is moved inwardly with the valve 10 closed, fuel will be displaced to the nozzle 11 by way of the delivery valve as soon as the port 17 is covered by the plunger. If during the inward movement of the plunger the valve 10 is opened, fuel will flow to a drain by way of the valve rather than to the nozzle. The valve 10 may be open during the initial movement of the plunger and closed when the plunger has moved inwardly to a predetermined position. The length of the stroke of the plunger 14 after the port 17 is closed and while the valve 10 is closed determines the amount of fuel supplied to the injection nozzle.

Figure 2:
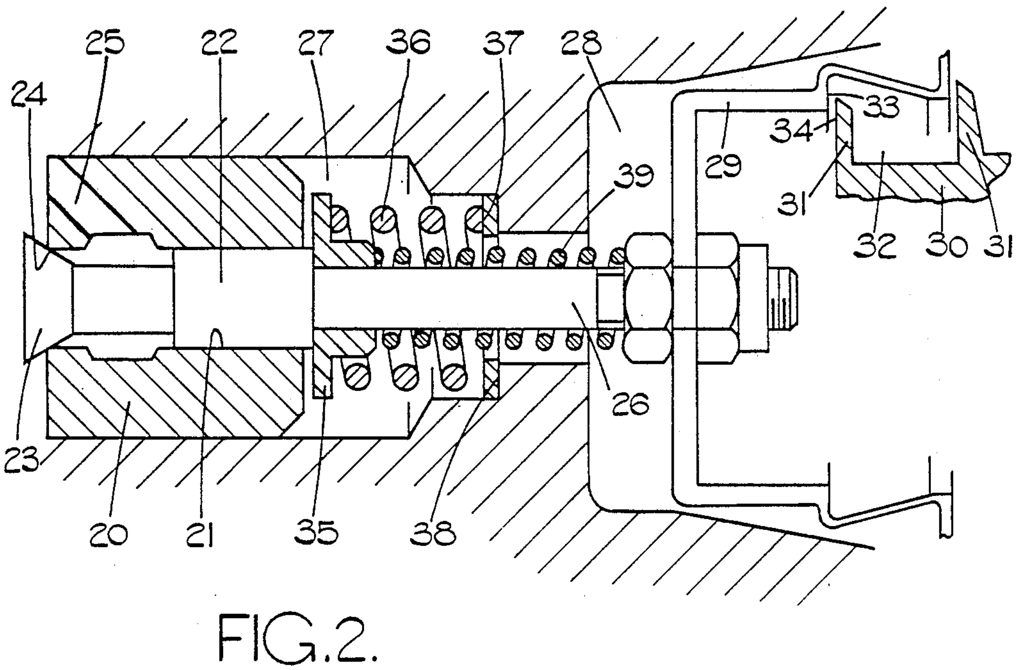
FIG. 2 shows an example of valve.

Turning now to FIG. 2 of the drawings the control valve comprises a valve body 20 in which is formed a bore 21 within which is mounted an axially movable valve member 22. The valve member defines a head 23 for co-operating in the closed position of the valve member with a seating 24 defined about one end of the bore. Beneath the valve head the bore is enlarged and communicates with a passage 25. In the closed position as shown of the valve member the end of the valve member remote from the head extends slightly from the opposite end of the bore and this end of the valve member carries an integral extension 26 which has a screw threaded end portion.

The valve body 20 is located within a chamber 27 in a valve housing 24 and also formed in the housing is a further chamber 28, the two chambers being interconnected through a central aperture. The extension 26 extends through the aperture into the chamber 28 and is secured to the base wall of a cup shaped armature 29 of an electromagnetic device which includes a stator structure part of which is shown at 30. The relative axial position of the armature 29 and the valve member 22 can be adjusted, this being allowed by the fact that the connection includes a pair of nuts disposed on the threaded portions of the extension and engaging the opposite end faces of the base wall of the armature.

The stator structure 30 defines a plurality of circumferential pole pieces 31 which are axially spaced from each other and which define grooves 32 therebetween. The pole pieces increase in diameter as the distance from the valve member increases and the armature is of complementary shape and defines a pole faces 33 which are presented to pole faces 34 defined by the pole pieces. The grooves 32 are occupied by windings respectively, the windings being arranged so that when energized, adjacent pole pieces 31 assume opposite magnetic polarity. Upon energisation the armature moves to the position shown with the movement being arrested by the abutment of the valve head 23 with the seating 24.

Slidable axially upon the extension is a spring abutment 35 and engaging the abutment is one end of a coiled compression spring 36 the other end of which bears against a shim 37 located against a step 38 defined by the end wall of the chamber 27. The spring 36 through the spring abutment 35 acts on the valve member to urge the valve member to the open position. Moreover, an anti bounce spring 39 surrounds the extension and acts between the abutment 35 and the nut which engages the armature.

In operation when the windings are deeneergised the spring 36 effects movement of all the moving parts towards the valve open position. However, when the spring abutment 35 contacts the valve body, continued motion of the valve member together with the armature can take place against the action of the spring 39. This is not intended to allow greater flow of fuel through the valve but merely to prevent bouncing of the valve when the spring abutment contacts the valve body. If this occurs then such bouncing will effectively reduce the flow area of the valve and could impede the flow of fuel.

I claim:

1. An electromagnetically operable fluid control valve comprising:

a valve body having a bore therein and spaced apart first and second shoulders in said bore;

an electromagnetic device including an armature which is movable with respect to said valve body;

a valve means movably located in said bore, said valve means including a head for closing said bore when said valve means is in a first position in said bore and for defining an opening into said bore when said valve means is in a second position in said bore, said valve means including an abutment spaced a predetermined distance from said head, said valve means being fixed to said armature for movement therewith;

a spring seat means positioned on said valve means adjacent to said valve means abutment, said spring seat means being slidably mounted on said valve means so that said valve means is movable with respect to said spring seat means, said spring seat means having a first abutment surface positioned for abutment against said valve means abutment and for abutment against said valve means first shoulder when said valve means is in said second position and to abut said valve means abutment but to be spaced from said valve means first shoulder when said valve means is in said first position, said spring seat means further including a first spring seating surface facing toward said valve body second shoulder;

a first spring means seated at one end thereof against said spring seat means first spring seating surface and at another end against said valve means a second shoulder for biasing said valve means toward said second position via said spring seat means; and return means for biasing said valve means into said second position with respect to said valve body, said return means including a second spring seating surface on said spring seat means, another spring seating surface on said valve means, and a second spring means seated at one end thereof against said second spring seating surface and at another end against said another spring seating surface for biasing said valve means toward said second position when said valve means is in a third position in said bore with said valve means head being located farther out of said bore in said third position than it is when said valve means is in said second position, said second spring means being biased against said valve body first shoulder via said spring seat means and against said valve means another surface to urge said valve means head toward a bore closing location when said valve means is in said third position yet does not exert any position altering bias on said valve means when said valve means is in said first or second positions.

2. A fluid control valve according to claim 1 in which said valve means is adjustably secured to the armature.

3. A fluid control valve according to claim 2 in which said armature is of cup shaped form and said valve means has a threaded portion extending through a base wall of the armature, said valve means carrying a pair of nuts engaging with opposite surfaces of the base wall.

4. A fluid control valve according to claim 1 including a shim located between said second shoulder and said first spring means.

* * * * *